(No Model.)
J. F. SHEPARD.
VEHICLE BRAKE.
No. 518,928. Patented Apr. 24, 1894.
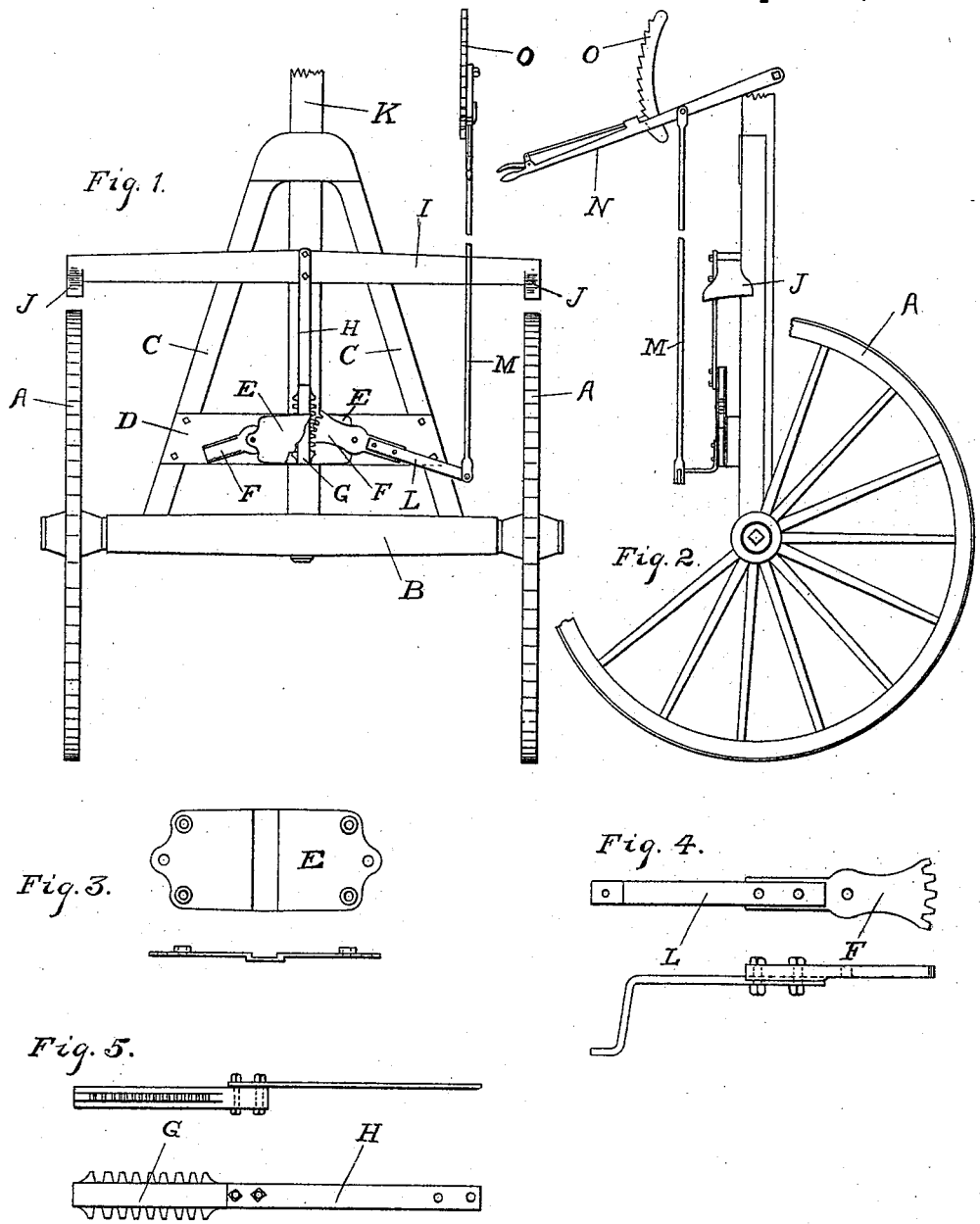

UNITED STATES PATENT OFFICE.

JOHN F. SHEPARD, OF JACKSON, MICHIGAN.

VEHICLE-BRAKE.

SPECIFICATION forming part of Letters Patent No. 518,928, dated April 24, 1894.

Application filed October 6, 1893. Serial No. 487,376. (No model.)

*To all whom it may concern:*

Be it known that I, JOHN F. SHEPARD, of the city and county of Jackson, State of Michigan, have invented a new and useful Device for Operating Brakes Upon Vehicles or any Wheeled Conveyance Requiring the Use of Brakes, of which the following is a specification.

My invention relates to an improved attachment for operating brakes, and upon vehicles, is attached to the "hounds" or under gearing, and is operated in connection with a brake beam, or other device for arresting by friction, the motion of the wheels, and the object of my invention is to secure greater leverage power in applying the brake, combined with simplicity and cost of manufacture, and its adaptability for appliance to any style of brake. I attain these objects by the mechanism illustrated in the accompanying drawings, in which—

Figure 1. shows top view of device attached to gearing. Fig. 2. shows side view of the same. Fig. 3. shows top and end view of plates between which the attachment is operated. Fig. 4. shows top and side view of lever. Fig. 5. shows top and side view of draw bar.

Similar letters refer to similar parts throughout the several views.

I is the brake beam extending across the vehicle and carrying the shoes J on its outer ends. To the center of the beam I is secured the draw bar H which extends back parallel with the reach K and on its outer end has bolted thereto a rack bar formed with racks on its opposite edges of a width less than the width of the bar.

E E are plates arranged above and below the rack bar and having central grooves in which the bar, on either side of the teeth, works and is closely held. These plates are fixedly secured to a stationary part of the vehicle and have pivotally secured at their opposite ends the levers F which are formed with segmental racks on their inner ends meshing with the racks on the rack bar. The levers are closely fitted between the plates and thereby held in engagement with the rack bar.

M is the brake rod connected with the hand lever N which is provided with a spring catch engaging the ratchet frame O on the body of the vehicle. By moving the lever N the levers F are moved which in turn moves the draw bar and brake beam.

Having thus described the invention, what is claimed as new, and desired to be secured by Letters Patent, is—

In a wagon brake, the combination with a fixed portion of a vehicle, of a brake beam extending across the vehicle and carrying shoes on its ends, a draw bar centrally secured to the beam and extending back, its rear end being provided with a rack bar having side racks of a width less than the bar, a top and bottom plate E having grooves therein in which the rack bar is closely fitted, brake levers pivoted to the outer ends of the plates and extending in between the same and having segmental racks on their inner ends meshing with the racks on the rack bar, and the actuating rod and lever for the brakes, substantially as described.

JOHN F. SHEPARD.

Witnesses:
HENRY S. BUTTS,
R. D. KNOWLES.